United States Patent [19]

Fisher

[11] Patent Number: 5,380,351
[45] Date of Patent: Jan. 10, 1995

[54] METHOD FOR AGGLOMERATION OF FLUE GAS DESULFURIZATION DUST

[75] Inventor: Bryan C. Fisher, Kennesaw, Ga.

[73] Assignee: ReUse Technology, Inc., Kennesaw, Ga.

[21] Appl. No.: 171,030

[22] Filed: Dec. 21, 1993

[51] Int. Cl.6 .............................................. C22B 7/02
[52] U.S. Cl. ....................................... 75/313; 75/961; 75/962
[58] Field of Search .......................... 75/313, 961, 962

[56] References Cited

U.S. PATENT DOCUMENTS

| | | | |
|---|---|---|---|
| 3,660,068 | 5/1972 | Wilson | 71/34 |
| 3,785,840 | 1/1974 | Minnick et al. | 106/118 |
| 3,836,353 | 9/1974 | Holley | 75/961 |
| 3,870,535 | 3/1975 | Minnick et al. | 106/118 |
| 3,888,653 | 6/1975 | Shirley | 71/61 |
| 4,015,973 | 4/1977 | Perrine | 71/63 |
| 4,028,087 | 6/1977 | Schultz et al. | 71/25 |
| 4,113,481 | 9/1978 | Kreiger | 75/313 |
| 4,168,150 | 9/1979 | Pircon et al. | 71/37 |
| 4,226,630 | 10/1980 | Styron | 106/85 |
| 4,316,813 | 2/1982 | Voss | 252/189 |
| 4,377,414 | 3/1983 | Buschmann et al. | 106/85 |
| 4,490,178 | 12/1984 | Loggers et al. | 106/118 |
| 4,595,576 | 6/1986 | Andreasen et al. | 423/242 |
| 4,673,431 | 6/1987 | Bricmont | 75/961 |
| 5,008,055 | 4/1991 | Holley | 264/117 |

OTHER PUBLICATIONS

A. V. Slack, Air Pollution: The Control of SO2 From Power Stacks, Part III–Processes for Recovering SO2, Dec. 4, 1967, pp. 188–196, Chemical Engineering.

Arthur M. Squires, Air Pollution: The Control of SO2 From Power Stacks, Part IV–Power Generation with Clean Fuels, Dec. 18, 1967, pp. 101–170, Chemical Engineering.

John M. Browning, Agglomeration: Growing Larger In Application And Technology, Dec. 4, 1967, pp. 147–170, Chemical Engineering.

Primary Examiner—Peter D. Rosenberg
Attorney, Agent, or Firm—Richard W. Evans

[57] ABSTRACT

A process for the agglomeration of flue gas desulfurization dust is disclosed comprising the steps of introducing flue gas desulfurization dust as feed material into a conventional, high-intensity mixing device and admixing with water to form spheroidal agglomerates ranging in size from a Tyler number of about 40 mesh to about ½ inches in size. The agglomerates are either dried to ambient temperature, or by dusting them with a portion of the dry feed material, and recovered. The process can effectively agglomerate any calcium- and sulfur-containing flue gas desulfurization dust by adjusting the amount of water added and providing for the proper amount of mixing energy and duration. The mixing device can be selected from any one of a group of conventional, high-intensity mixers consisting of, but not limited to, a pin mixer, paddle mixer, plow mixer, pan pelletizer and disc pelletizer. An agglomerate produced in accordance with the present invention is a free-flowing, non-dusting, non-hygroscopic product of desirable size having application as a soil additive which can be spread easily in agricultural type spreaders.

26 Claims, 1 Drawing Sheet

METHOD FOR AGGLOMERATION OF FLUE GAS DESULFURIZATION DUST

BACKGROUND

This invention relates generally to a method for agglomeration of flue gas desulfurization dust, and more particularly to a method for agglomeration of dry, free-flowing dusts containing calcium and sulfur such as those resulting from the flue gas scrubbing of combustion processes using calcium-based scrubber reagents. This invention further relates to the use of the agglomerated product as a soil additive.

Calcium-based scrubber reagents are being used to remove sulfur oxides ($SO_x$) from the flue gases resulting from the combustion of carbonaceous, sulfur-bearing fuels of all types, such as coal burning power stations. A dry powder, aqueous suspension, or solution of the scrubber reagent is injected or atomized into the flue gas for the absorption of $SO_x$ producing a dry waste dust. The products of reaction of the calcium compounds in the scrubber reagent with the $SO_x$ in the flue gases include calcium sulfite ($CaSO_3$) and calcium sulfate ($CaSO_4$). These reaction products, unreacted calcium compounds, and flyash, along with other emissions, are generally removed in dust collectors such as electrostatic precipitators or fabric filter baghouses. The final composition of the dust thus removed depends on several factors including the composition of the flyash in the flue gas, the composition of the calcium-based scrubber reagent, and on the operation of the scrubber equipment.

Enormous amounts of flue gas desulfurization dust are produced annually nationwide, principally from the burning of coal in power plants. The collected dust is a very fine, powdery substance which leads to storage and handling problems because it is difficult to confine to a desired area. Disposal of flue gas desulfurization dust poses an increasingly difficult problem because the volume, powder-like nature and varied chemical composition of the dust limit the number of acceptable disposal options. Furthermore, the capacity of acceptable disposal sites is not unlimited. Moreover, calcium sulfite is a relatively insoluble salt and a high calcium sulfite content in the dust may cause some restrictions as to the disposal or industrial utilization of the dust.

The use of calcium and sulfur as soil additives is well known. However, many of the forms in which calcium and sulfur can be added to the soil, such as calcium sulfite, are relatively insoluble. Furthermore, calcium sulfite typically exhibits thixotropic properties and does not readily lend itself to agglomeration. Therefore, flue gas desulfurization dust has heretofore had limited agricultural applicability.

For reasons such as the foregoing, there is a need for a method for economically rendering the dust produced by flue gas desulfurization systems into a free-flowing, handleable and useful product rather than merely discarding it. Ideally, the product would have agricultural application as a soil additive. Thus, there is a need for an economical use of flue gas desulfurization dust from the calcium-based scrubbing of combustion flue gases.

SUMMARY

The present invention is directed to a process for the agglomeration of flue gas desulfurization dust that satisfies these needs. Free-flowing flue gas desulfurization dust is introduced as a feed material into a conventional, high-intensity mixing device and mixed with water to form spheroidal agglomerates between a Tyler number of about 40 mesh and about ½ inches in size. The agglomerates are either dried to ambient temperature, or by dusting them with a portion of the dry feed material, and recovered. The agglomeration process is effective for flue gas desulfurization dust comprising predominantly calcium sulfite, lesser amounts of calcium sulfate, and other trace constituents. The feed material, depending on its source, can have contained in it other solid extraneous materials. However, the process can effectively agglomerate any calcium- and sulfur-containing flue gas desulfurization dust by adjusting the amount of water added and providing the proper amount of mixing energy. The mixing device can be selected from any one of a group of conventional, high-intensity mixers consisting of, but not limited to, a pin mixer, paddle mixer, plow mixer, pan pelletizer and disc pelletizer.

An agglomerate produced in accordance with the present invention is a free-flowing, non-dusting, non-hygroscopic product of desirable size. The handling and storage characteristics of the agglomerate are greatly improved over those of the feed material. The agglomerate is easily stored, handled and distributed with conventional solids handling equipment.

The agglomerated product has application as a soil additive as a source of sulfur and calcium for plants. The agglomerate can be spread easily in agricultural spreaders without fear of clogging or bridging. Therefore, by the process of the present invention, a waste product dust which presents a storage and disposal problem and which does not readily agglomerate is rendered an agglomerated, marketable product.

A further aspect of this invention is to provide a novel method by which calcium and sulfur compounds can be made useful as a soil additive. The agglomerate has plant nutrient value due to the calcium, sulfur and other trace plant nutrients in the flue gas desulfurization dust. The agricultural usefulness and marketability of the agglomerate offsets the costs of production.

BRIEF DESCRIPTION OF THE DRAWINGS

These and other features, aspects and advantages of the present invention will become better understood with regard to the following description, appended claims, and accompanying drawing where:

DESCRIPTION

Figure 1:
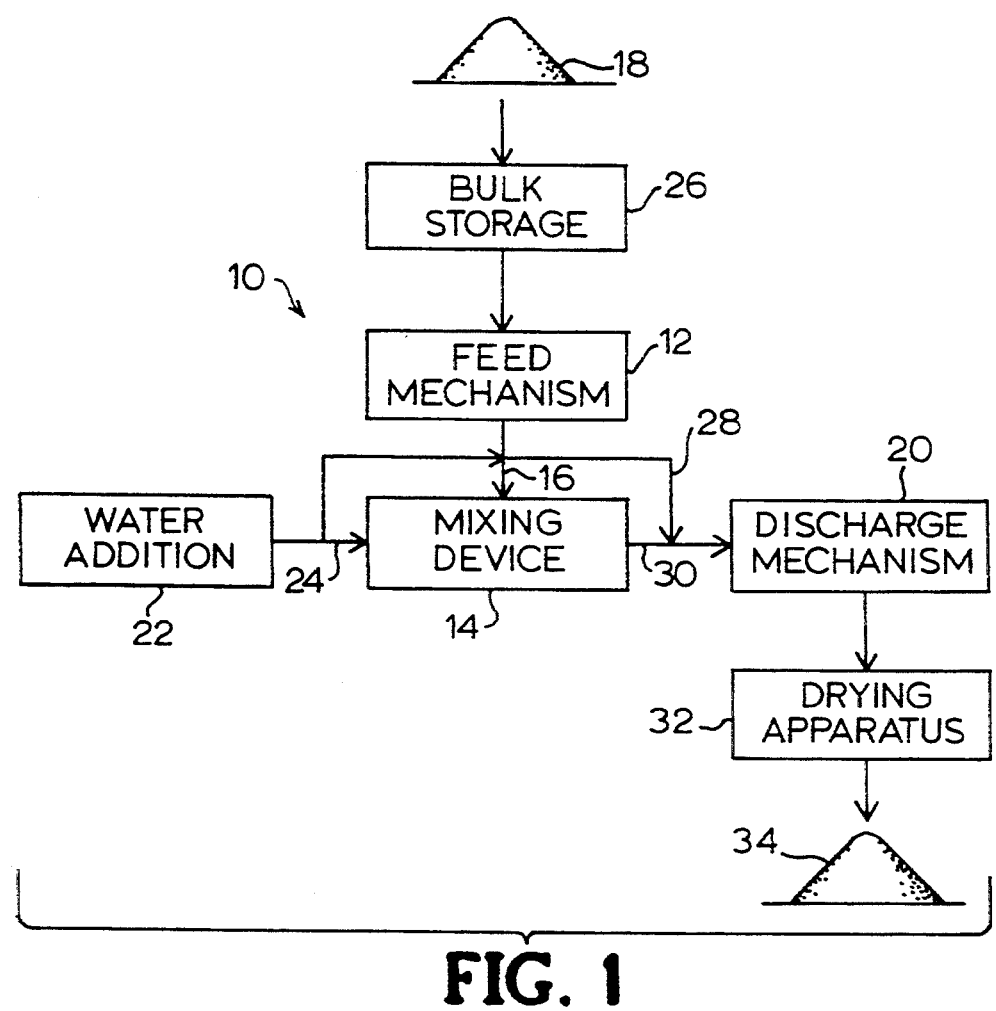
FIG. 1 is a flow diagram of an embodiment comprising all the steps of the process according to the present invention.

A typical process is given by way of illustration and not by way of limitation in order that those skilled in the art may better understand the present invention. As shown in FIG. 1, one possible process flow diagram of the equipment for utilizing the process of the present invention, denoted generally by the numeral 10, comprises a feed mechanism 12; a mixing device 14 provided with an inlet 16 for feed material 18 and a discharge mechanism 20; and a source of water addition 22 supplied through a water inlet 24. The feed material 18 may be supplied directly or from a bulk storage 26 container. A bypass chute 28 is provided for adding feed material 18 to the agglomerated product 34 at the outlet 30 of the mixing device 14 for drying the product. Optionally, a drying apparatus 32 may be added.

The feed material 18 is dry, free-flowing flue gas desulfurization dust. It will be understood that the term "flue gas desulfurization dust" as used herein is intended to mean the products of the reaction of calcium-based scrubber reagent with sulfur oxides in the flue gases resulting from the combustion of carbonaceous, sulfur-bearing fuels of all types. The gross composition of flue gas desulfurization dust will vary with the nature of the fuel burned and its resultant ash, the combustion conditions, the amount of scrubbing reagent used and the conditions of the scrubbing operation. The products of the reaction are predominantly calcium sulfite, minor amounts of calcium sulfate, and other trace constituents. Preferably, the flue gas desulfurization dust contains at least 80 percent calcium sulfite. Flue gas desulfurization dust is a very fine, dusty material. The feed material 18 of the present invention is predominantly less than a Tyler number of about 200 mesh. Due to the handling and storage problems created by flue gas desulfurization dust, there is a need to agglomerate the dust into larger particles.

The feed mechanism 12 may be a rotary vane feeder, screw conveyor, feed auger, conveyor, or any other similar type of feeder which is capable of handling a dry, free-flowing dust.

The mixing device 14 is a conventional, high-intensity mixer such as a pin mixer, paddle mixer, plow mixer, pan pelletizer, disc pelletizer, or other similar mixer. High-intensity mixing is required to ensure that each particle of feed material 18 is coated with water.

The process of the present invention 10 may be continuous or batch. The feed material 18 is introduced, either from bulk storage 26 or directly, at the inlet 16 to the mixing device 14 at a fixed rate via the feed mechanism 12. The feed material 18 can be stored for a period of weeks or months and still be useful in the process of the present invention.

Water is then brought into contact with the feed material 18 to form a wet mixture. Water addition 22 to the feed material 18 may be accomplished in any suitable manner that ensures uniform distribution. However, a fine spray form of water addition 22 is preferred. Water addition 22 is preferably carried out after the feed material 18 is introduced into the mixing device 14. Alternatively, the water may be added to the feed material 18 before the feed material 18 is introduced at the inlet 16 to the mixing device 14.

The amount of added water is important in accomplishing the process of the present invention. Flue gas desulfurization dusts from different sources have different water requirements based on the reactivity and physical characteristics of the dusts which, as noted above, will vary with the nature of the fuel burned and its resultant ash; the combustion conditions; the amount of scrubbing reagent used; and the conditions of the scrubbing operation. The amount of added water will therefore vary within a range depending on the characteristics of the feed material 18 to be agglomerated. In practice, the amount of water added to the feed material 18 is such as to form a wet mixture comprising a moisture content of from about 20 to about 60 weight percent, based on the weight of the dry feed material 18, and preferably from about 20 to about 35 weight percent. A moisture content of less than 20 weight percent based on the weight of the dry feed material 18 is generally insufficient to form agglomerates; a moisture content of greater than about 60 weight percent generally exceeds the capacity of the feed material 18 to absorb water. The preferred moisture content is at least about 20 weight percent based on the weight of feed material 18, but no more than about 35 weight percent.

The wet mixture is then rapidly admixed in the mixing device 14 to form agglomerates. High-intensity mixing optimizes the distribution of water throughout the wet mixture coating each of the particles of the feed material 18 with water. Control of the amount of water addition 22 in relation to the rate and duration of mixing is required. These factors are controlled to produce the hard, free-flowing agglomerates of the present invention.

The rate and duration of mixing necessary to form agglomerates varies depending on the type of mixing device 14 used, the characteristics of the feed material 18, and the moisture content of the wet mixture. For example, with a pin mixer, the rate of mixing is in the range of about 450 to about 900 rpm for about 15 seconds to about one minute. Pin mixers can vary significantly in pin types, from true pins protruding from the shaft to a thin paddle that may have variable pitch. The pin type, the number of pins and their respective positions in the mixer control the velocity and turbulence to which a particle of the feed material 18 is exposed. The means for water addition 22 also plays a significant role in determining the mixing conditions for the pin mixer. Less turbulent mixing is possible where water addition 22 is in the form of a fine spray thereby more uniformly dispensing the water. This is less important where the mixing conditions are more turbulent thereby providing for a more thorough blending of water and feed material 18. The pin mixer also lends itself to a continuous process as opposed to a batch type process.

The rate and duration of mixing for a paddle mixer is in the range of about 200 rpm to about 600 rpm for about 30 seconds to about four minutes. Paddle mixers typically have variable pitch paddles that can be used to affect the mixing conditions. The number of paddles further contributes to the resultant mixing conditions.

The rate and duration of mixing for a plow mixer is in the range of about 60 rpm to about 600 rpm for about 1 minute to about 6 minutes. For a pan pelletizer, the duration of mixing is less than about four minutes. The rate of mixing of the pan pelletizer is variable. However, it is well documented that pan pitch and the location of water addition 22 on the pan can be varied to optimize agglomerating efficiency and agglomerated product 34 size.

The rates and durations of mixing provided for various types of mixing devices above are intended as examples only. It will be understood that the key to agglomerating the feed material 18 by the process of the present invention 10 is ascertaining the proper combination of the amount of water added and the mixing energy imparted. Sufficient energy must be provided by the mixing device 14 to form agglomerates. However, if too much mixing energy is imparted to the wet mixture the agglomerates, once formed, will turn to mud if the moisture level is above the minimum required for agglomeration. Since flue gas desulfurization dust composition can vary depending on its source, a series of trials may be necessary to determine the proper combination of water and energy to be added for each particular application.

Once formed, the agglomerates are discharged from the outlet 30 of the mixing device 14 via a discharge mechanism 20 such as a conveyor, auger, or other suitable material handling equipment, and recovered. The agglomerates range in size from a Tyler number about about 40 mesh to about ½ inches. Agglomerates less than a Tyler number of about 40 mesh in size are not as free-flowing and handleable as desired; agglomerates greater than about ½ inches in size are too large for agricultural type spreading equipment. The preferred size of the agglomerates is between a Tyler number of about 8 mesh to about ⅜ inches, which is in the range acceptable as conventional fertilizer. More preferably the agglomerates are about ⅛ inches in size with minimal dust.

The agglomerates are stockpiled to dry to ambient temperature for a period of at least one day. Once dried, the agglomerates do not degenerate to mud when water is added. Optionally, the agglomerates may be dried by dusting them with dry feed material 18 or by a drying apparatus 32 such as through the introduction of by-product heat from a mechanical process. The former involves transferring an amount of dry feed material 18 from the feed mechanism 12 via a bypass chute 28 which delivers it to the outlet 30 of the mixing device 14. The amount of feed material 18 used for drying the agglomerates ranges from about 2 percent to about 10 percent by weight of the dry feed material 18 fed to the mixing device 14, and is preferably about 5 weight percent. Once dried, the agglomerates are non-hygroscopic, therefore they are not materially affected by exposure to the atmosphere. The agglomerates may be either bagged or shipped in bulk.

The previously described aspects of the present invention have many advantages, including the production of a handleable, free-flowing agglomerate from a very fine, powdery feed material which presents both handling and disposal problems. Furthermore, unlike the feed material, the agglomerates have agricultural application as a soil additive with inherent plant nutrient value due to their calcium and sulfur content. The agglomerates are particularly marketable as a soil additive with excellent spreading characteristics.

Through the process of the present invention, it is feasible for power generating companies utilizing sulfur-containing fuels to produce an agglomerate from the by-product of their desulfurization process which is marketable to agricultural growers as a soil additive. The need to dispose of the dust and the costs of disposal are thereby reduced and additional revenue is generated by the sale of the agglomerates. Another advantage of the present invention is the flyash retained in the flue gas desulfurization dust contains minerals which are trace nutrients for crops and which are not usually found in conventional fertilizers. This adds to the value of the agglomerates as a soil additive.

The use of the product of the present invention as an agricultural material is due to the calcium and sulfur content of the agglomerates. The soil improvement obtained through the addition of calcium and sulfur is well known. The process of the present invention is capable of producing an agricultural product from insoluble forms of sulfur and calcium. A flue gas desulfurization dust which is predominantly calcium sulfite can be agglomerated by the process of the present invention to form a soil additive which is useful for peanut growing. The desirable size and free-flowing nature of the agglomerates contribute to its handleability and spreadability in agricultural type spreaders.

Although the present invention has been described in considerable detail with reference to certain preferred versions thereof, other versions are possible. For example, other dusts may be used as feed material such as cement, lime, ESP flyash, byproduct calcium sulfate, and the like. The spirit and scope of the appended claims should not be limited to the description of the preferred versions contained herein.

What is claimed is:

1. A process for producing an agglomerate, which process comprises the steps of:
    a. providing a feed material comprising a flue gas desulfurization dust formed from the reaction of a calcium-based scrubber reagent with sulfur oxides in a flue gas resulting from the combustion of carbonaceous, sulfur-bearing material;
    b. introducing the feed material into a mixing device;
    c. introducing an amount of water into contact with the feed material, wherein the amount of water is appropriate to agglomerate the feed material;
    d. admixing the feed material and the amount of water for a length of time appropriate to form agglomerates; and
    e. drying the agglomerates to produce free-flowing agglomerates.

2. The process for producing an agglomerate according to claim 1, wherein about 50 weight percent of the feed material has a Tyler number greater than about 100.

3. The process for producing an agglomerate according to claim 1, wherein the feed material comprises predominantly calcium sulfite, lesser amounts of calcium sulfate, and other trace constituents.

4. The process for producing an agglomerate according to claim 1, wherein the flue gas desulfurization dust comprises at least 80 weight percent calcium sulfite.

5. The process for producing an agglomerate according to claim 1, wherein the mixing device is selected from the group consisting of a pin mixer, paddle mixer, plow mixer, pan pelletizer, and disc pelletizer.

6. The process for producing an agglomerate according to claim 1, wherein the amount of water introduced into contact with the feed material is from about 20 to about 60 weight percent based on the weight of the feed material.

7. The process for producing an agglomerate according to claim 1, wherein the amount of water introduced into contact with the feed material is from about 20 to about 60 weight percent based on the weight of the feed material.

8. The process for producing an agglomerate according to claim 1, wherein the water is introduced into contact with the feed material to form a wet mixture prior to introducing the feed material into the mixing device.

9. The process for producing an agglomerate according to claim 1, wherein the water is introduced into contact with the feed material to form a wet mixture while the feed material is being admixed.

10. The process for producing an agglomerate according to claim 1, wherein the agglomerates are dried at ambient temperature.

11. The process for producing an agglomerate according to claim 1, wherein the agglomerates are dried by dusting the agglomerates with about 2 to about 10 weight percent of the feed material introduced to the mixing device.

12. The process for producing an agglomerate according to claim 1, wherein the agglomerates are dried by dusting the agglomerates with about 5 weight percent of the feed material introduced to the mixing device.

13. The process for producing an agglomerate according to claim 1, wherein the agglomerates are dried by utilizing a mechanical system to introduce heat of drying.

14. The process for producing an agglomerate according to claim 1, wherein the agglomerates range in size from a Tyler number of about 40 mesh to about ½ inches.

15. The process for producing an agglomerate according to claim 1, wherein the agglomerates range in size from a Tyler number of about 8 mesh to about ⅜ inches.

16. The process for producing an agglomerate according to claim 1, wherein the agglomerates are about ¼ inches in size.

17. An agglomerate produced in accordance with claim 1.

18. The process for producing an agglomerate according to claim 1, wherein the length of time of the admixing step is from about 15 seconds to about 6 minutes.

19. The process for producing an agglomerate according to claim 1, wherein the mixing device is a pin mixer operating at between about 450 rpm and about 900 rpm.

20. The process for producing an agglomerate according to claim 19, wherein the length of time of the admixing step is from about 15 seconds to about 1 minute.

21. The process for producing an agglomerate according to claim 1, wherein the mixing device is a paddle mixer operating at between about 200 rpm and about 600 rpm.

22. The process for producing an agglomerate according to claim 21, wherein the length of time of the admixing step is from about 30 seconds to about 4 minutes.

23. The process for producing an agglomerate according to claim 1, wherein the mixing device is a plow mixer operating at between about 60 rpm and about 600 rpm.

24. The process for producing an agglomerate according to claim 23, wherein the length of time of the admixing step is from about 1 minute to about 6 minutes.

25. The process for producing an agglomerate according to claim 1, wherein the mixing device is a pan pelletizer and the length of time of the admixing step is less than about 4 minutes.

26. The process for producing an agglomerate according to claim 1, wherein the mixing device is a disc pelletizer and the length of time of the admixing step is less than about 4 minutes.

* * * * *